(12) United States Patent
Jin

(10) Patent No.: US 6,960,644 B2
(45) Date of Patent: Nov. 1, 2005

(54) WATER-SOLUBLE BLOCK COPOLYMER AND PRODUCTION METHOD THEREFOR

(75) Inventor: Ren-Hua Jin, Tokyo (JP)

(73) Assignee: Kawamura Institute of Chemical Research, Sakura (JP)

( * ) Notice: Subject to any disclaimer, the term of this patent is extended or adjusted under 35 U.S.C. 154(b) by 0 days.

(21) Appl. No.: 10/661,554

(22) Filed: Sep. 15, 2003

(65) Prior Publication Data

US 2004/0054127 A1 Mar. 18, 2004

(30) Foreign Application Priority Data

Sep. 17, 2002 (JP) ........................................ 2002-270064

(51) Int. Cl.$^7$ ......................... C08G 73/00; C08G 83/00
(52) U.S. Cl. ..................... 528/422; 528/423; 528/425; 525/410; 525/417; 525/540; 524/800; 524/801
(58) Field of Search ................................ 528/422, 423, 528/425; 525/410, 417, 540; 524/800, 801

(56) References Cited

U.S. PATENT DOCUMENTS

| | | | |
|---|---|---|---|
| 4,224,421 A | * | 9/1980 | Streit et al. ................. 525/403 |
| 4,605,707 A | | 8/1986 | Reimschuessel et al. ... 525/410 |
| 5,641,855 A | * | 6/1997 | Scherr et al. ............... 528/310 |

FOREIGN PATENT DOCUMENTS

| | | | |
|---|---|---|---|
| EP | 1400 555 A1 | * | 3/2004 |
| JP | 63-065940 | * | 3/1988 |
| JP | 07-173284 | * | 7/1995 |
| JP | 8-120035 | | 5/1996 |
| JP | 2002-194116 | * | 7/2002 |

OTHER PUBLICATIONS

Biomacromolecules, 2001, 2, 70–79, "Polymer–Supported Lipid Bilayers on Benzophenone–Modified Substrates", William W. Shen et al.*
XP002258794: Shen et al; "Polymer–Supported Lipid Bilayers ...Substrates"; Biomacromolecules 2001, 2, 70–79. European Search Report dated Nov. 10, 2003.
M. Sedlak et al.; "Synthesis of new class of double–hydrophilic blockcopolymers with calcium binding capacity as builders and for biomimetic structure control of minerals"; *Macromolecular Chemistry and Physics*; vol. 199; 1998; pp. 247–254./Dicussed in the specification.

* cited by examiner

*Primary Examiner*—P. Hampton Hightower
(74) *Attorney, Agent, or Firm*—Armstrong, Kratz, Quintos, Hanson & Brooks, LLP

(57) ABSTRACT

A water-soluble block copolymer having a mass average molecular weight of 2500 to 800000 and comprising, within a molecule, a poly(ethylene imine) block unit and a poly (N-propionylethylene imine) block unit is a novel linear or star-shaped water-soluble block copolymer.

12 Claims, No Drawings

WATER-SOLUBLE BLOCK COPOLYMER AND PRODUCTION METHOD THEREFOR

BACKGROUND OF THE INVENTION

1. Field of the Invention

The present invention relates to a water-soluble block copolymer which has a molecular chain comprising a cationic block capable of forming an ion complex with an anionic compound and a non-ionic block, and which is useful in a wide range of applications such as gene carriers, dyes and pigments dispersants for paints and inks, and the like, and the present invention relates to a manufacturing method therefor.

2. Description of the Related Art

Conventionally, poly(ethylene imine) has been used in paper manufacturing, cosmetics, water purification, and so on. However, in recent years, poly(ethylene imine), which is a cationic polymer, has been gaining attention as a gene carrier because it forms an ion complex with anionic biopolymers, such as DNA, due to an electrostatic interaction.

Poly(ethylene imine) is a conventional cationic water-soluble polymer, but when it forms an ion complex with anionic biopolymers such as DNA, it becomes insoluble in water, and as a result, the applications therefor are extremely limited.

For this reason, double-hydrophilic block copolymers have been proposed. These double-hydrophilic block copolymers have water solubility in both blocks, but both blocks have respectively different properties. As a result, a nano-micelle in which the ion complex forms a core and the non-ionic block forms a corona is formed, and the nano-micelle uniformly disperses in water. A nano-micelle obtained in this way can be used in a wide variety of applications and, in particular, is useful as a DNA carrier.

For example, a water-soluble block copolymer can be mentioned which is obtained by coupling poly(ethylene imine) with poly(ethylene glycol) having an epoxy group at one end of the molecular chain (for example, refer to Milos Sedlak, et al, "Macromolecular Chemistry and Physics", 1999, Vol. 199, p. 247 to 254). This water-soluble block copolymer has the problem that it has poor compatibility with organic.

In addition, a random copolymer of ethyleneimine and ethyloxazoline which is obtained by hydrolysis of a part of the poly(ethyloxazoline) is also known (for example, refer to Japanese Unexamined Patent Application, First Publication No. 2002-194116). With regard to this copolymer, since it is prepared as simply as hydrolyzing the polyethyloxazoline, even though it is a random copolymer, it is definitely not a block copolymer. Even though this random copolymer has the characteristic of forming an ionic bond with anionic compounds, it does not display the characteristic of forming an ion complex nano-micelle having a clear core and corona division as is displayed by block copolymers.

Furthermore, a graft copolymer obtained by reacting a linear poly(ethylene imine) and 2-ethyl-2-oxazoline has also been proposed (refer to Japanese Unexamined Patent Application, First Publication No. Hei 8-120035). This copolymer is a graft copolymer in which since the main chain polymer is poly(ethylene imine), the poly(2-ethyl-2-oxazoline) is bonded to the numerous nitrogen atoms within the molecule, and this is not a so-called block copolymer.

BRIEF SUMMARY OF THE INVENTION

An object of the present invention is the provision of a water-soluble block copolymer having a linear molecular chain comprising a linear cationic block and a linear non-ionic block which is water soluble and has solubility in organic solvent, and the provision of a production method therefor.

The present invention provides a water-soluble block copolymer having a mass average molecular weight of 2500 to 800000 and having, within the molecule, a poly(ethylene imine) block unit and a poly(N-propionylethylene imine) block unit.

In addition, the present invention provides a water-soluble block copolymer having a mass average molecular weight of 2500 to 800000 and represented by one of:

| | |
|---|---|
| X-(A-B)$_n$ | General Formula (1a): |
| X-(B-A)$_n$ | General Formula (1b): |
| [X-(A-B)$_n$]$_m$-Y | General Formula (2a): |
| and | |
| [X-(B-A)$_n$]$_m$-Y | General Formula (2b): |

(in the formulae, X is a residue of a monovalent or greater polymerization initiator; A is a poly(ethylene imine) block unit; B is a poly(N-propionyl ethylene imine) block unit; Y is a residue of a monovalent or greater terminal compound; n is an integer being at least 1 and being within the range of valences of X; and m is an integer being at least 1 and being within the range of valences of X).

Furthermore, the present invention provides a production method for a water-soluble block copolymer comprising forming an emulsion by dispersing a water-soluble block copolymer having, in the molecule, a poly(N-formylethylene imine) block unit or a poly(N-acetylethylene imine) block unit, and a poly(N-propionylethylene imine) block unit in a solvent mixture of water and an organic solvent which is not immiscible with water and in which poly(N-propionylethylene imine) is soluble; and preferentially hydrolyzing the poly(N-formylethylene imine) block unit or the poly(N-acetylethylene imine) block unit of the water-soluble block copolymer in the presence of an acid or an alkali.

The present invention is able to provide a novel linear or star-shaped water-soluble block copolymer having a molecular chain comprising an ethylene imine block, which is a cationic block, and a propionylethylene imine block.

In addition, according to the production method for a water-soluble block copolymer of the present invention, by forming an emulsion by dispersing a block precursor in a solvent mixture of water and an organic solvent which is not immiscible with water and in which the propionylethylene imine block are soluble; and carrying out preferential hydrolysis in the presence of an acid or an alkali, it is possible to obtain a linear or star-shaped water-soluble block copolymer having a molecular chain comprising an ethylene imine block, which is an cationic block, and a propionylethylene imine block.

DETAILED DESCRIPTION OF THE INVENTION

The water-soluble block copolymer of the present invention has an mass average molecular weight of 2500 to 800000 and has a linear poly(ethylene imine) block unit (hereinafter, simply referred to as an ethylene imine block) and a linear poly(N-propionylethylene imine) block unit (hereinafter, simply referred to as a propionylethylene imine block).

The ethylene imine block A and propionylethylene imine block B which make up the water-soluble block copolymer of the present invention are bonded in the pattern of A-B, A-B-A, B-A-B, or A-B-A-B- . . . , and, in particular, bonding in the patterns of A-B and B-A are preferable.

Representative water-soluble block copolymers of the water-soluble block copolymer of the present invention are shown below.

Water-soluble block copolymers can be mentioned which have a mass average molecular weight of 2500 to 8000000 and which are represented by:

| X-(A-B)$_n$ | General Formula (1a): |
| X-(B-A)$_n$ | General Formula (1b): |
| [X-(A-B)$_n$]$_m$-Y | General Formula (2a): |
| and | |
| [X-(B-A)$_n$]$_m$-Y | General Formula (2b): |

(in the formulae, X is a residue of a monovalent or greater polymerization initiator; A is an ethylene imine block; B is a propionylethylene imine block; Y is a residue of a monovalent or greater terminal compound; n is an integer being at least 1 and being within the range of values of X; and m is an integer being at least 1 and being within the range of values of X).

The monovalent or greater polymerization initiator in the above-mentioned formulae is an initiator of cationic ring-opening living polymerization, and it is a low molecular weight compound or a high molecular weight compound. This polymerization initiator preferably has a valence of from 1 to 12, and it bonds to ethylene imine blocks A or propionylethylene imine blocks B in accordance with that valence. For this reason, when the valence of the polymerization initiator is 1 or 2, a straight chain water-soluble block copolymer is formed, when the valence is higher than that, a star-shaped water-soluble block copolymer is formed, and in particular, a typical star shape is formed with a benzene skeleton having a valence of 6. Moreover, when the valence of the polymerization initiator is higher and a terminal compound, mentioned below, is bonded, it is preferable to select a terminal compound having a valence of 1 such that gelling of the water-soluble block copolymer does not occur.

As polymerization initiators which are low molecular weight compounds, compounds having in the molecule a functional group such as a chloroalkyl group, a bromoalkyl group, an iodoalkyl group, a toluenesulfonyloxy group, or a trifluoromethylsulfonyloxy group can be used. More specifically, for example, there can be mentioned monovalent compounds such as chloromethylbenzene, bromomethylbenzene, iodomethylbenzene, toluenesulfonic acid methylbenzene, trifluoromethylsulfonic acid methylbenzene, bromomethane, iodomethane, toluenesulfonic acid methane or toluene sulfonic anhydride, trifluoroemethylsulfonic acid anhydride, 5-(4-bromomethylphenyl)-10, 15, 20-tri(phenyl) porphyrin, and bromomethylpyrene; divalent compounds such as dibromomethyl benzene, diiodomethyl benzene, dibromomethylbiphenylene, and dibromomethylazobenzene; trivalent compounds such as tribromomethylbenzene; tetravalent compounds such as tetrabromomethylbenzene, tetra(4-chlorormethylphenyl)porphyrin, and tetrabromoethoxyphthalocyanine; and pentavalent or greater compounds such as hexabromomethylbenzene, and tetra(3,5-ditosylethyloxyphenyl)porphyrin.

A large number of alcohol compounds can be used as simple polymerization initiators by subjecting them to tosylation or bromination.

Among these, bromoalkyl, iodoalkyl, toluenesulfonic acid alkyl, and trifluoromethylsulfonic acid alkyl increase the polymerization initiation efficiency, and, in particular, the use of bromoalkyl or toluenesulfonic acid alkyl is preferable.

In addition, pigments having a functional group capable of initiating the above-mentioned cationic ring-opening living polymerization, and having a skeleton of any of a porphyrin skeleton, a phthalocyanine skeleton, or a pyrene skeleton, having a luminescent function due to light, an energy transfer function, or an electron transfer function, can give a special function to the obtained water-soluble block copolymer.

As the polymerization initiators which are high molecular weight compounds, for example, it is possible to use compounds in which a bromine atom or an iodine atom is bonded to the terminal carbon atom of a poly(ethylene glycol), compounds in which a toluenesulfonyl group is bonded to a terminal oxygen atom, or the like. In that case, the molecular weight of the poly(ethylene glycol) may be 800 to 10000, and a molecular weight of 1500 to 5000 is particularly preferable.

The above-mentioned monovalent or greater terminal compound essentially terminates the end of the ethylene imine block A or the propionylethylene imine block B, preferably has a valence of 1 to 12, and bonds to ethylene imine blocks A or propionylethylene imine blocks B in accordance with that valence. For this reason, when the valence of the polymerization initiator is 1 or 2, a straight chain water-soluble block copolymer is formed, and when the valence is higher than that, a water-soluble block copolymer which is star-shaped or has a shape having a plurality of linked stars is formed. Moreover, it is preferable to select a monovalent terminal compound such that the water-soluble block copolymer does not gel as occurs when the valence of the terminal compound is large.

Specific examples of the terminal compound include 5-(4-aminophenyl)-10, 15, 20-tri(phenyl)porphyrin, tetra(4-aminophenyl)porphyrin, aminopyrene, aminomethylpyrene, 5-(4-hydroxyphenyl)-10, 15, 20-tri(phenyl) porphyrin, tetra (4-hydroxyphenyl)porphyrin, tetra(3,5-dihydroxyphenyl) porphyrin, tetraaminophthalocyanine, and the like. These compounds may have substituents. Among these, pigments having a skeleton of any of a porphyrin skeleton, a phthalocyanine skeleton, or a pyrene skeleton having a luminescent function, an energy transfer function, or an electron transfer function, can give a special function to the obtained water-soluble block copolymer.

In addition, the water-soluble block copolymer of the present invention has a residue of a polymerization initiator, but it does not necessarily have to have the above-mentioned residue of a terminal compound, and in that case, a group separated from the polymerization initiator or a hydrogen atom is bonded.

The water-soluble block copolymer of the present invention has a mass average molecular weight of 2500 to 800000, and preferably 5000 to 100000, and the molar ratio of propionylethylene imine block B with respect to ethylene imine block A is preferably 0.1 to 10, more preferably 0.1 to 0.95, and even more preferably 0.3 to 0.7. When the mass average molecular weight is within the above-mentioned range, good solubility in water is displayed and it has the characteristic of forming stable ion association micelles with anionic compounds, and therefore, a mass average molecular weight within this range is preferable.

The degree of polymerization of the ethylene imine block A and the propionylethylene imine block B which make up the water-soluble block copolymer is preferably 20 or greater. When the degree of polymerization of each block is less than 20, the special characteristics as a block copolymer are not readily manifested. The number of blocks contained within a single molecular chain is not particularly limited and can be appropriately selected in accordance with the use, but di-block forms or tri-block forms which readily form nano-micelles by ion complex association are preferable.

In addition, the degree of polymerization per molecular chain of water-soluble block copolymer is preferably 50 to 5000. More specifically, when the water-soluble block copolymer is star-shaped, there is a plurality of block chains, and it is preferable for the degree of polymerization per molecular chain to be within the above-mentioned range.

Next, the production method of the water-soluble block copolymer of the present invention is described. The production method which is described in detail below is a breakthrough by which a novel water-soluble block copolymer having a linear molecular chain comprising an ethylene imine block and a propionylethylene imine block can be produced.

More specifically, the water-soluble block copolymer of the present invention can be produced by forming an emulsion by dispersing a water-soluble block copolymer (hereinafter referred to as "the block precursor") having, in the molecule, a linear poly(N-formylethylene imine) block unit or a linear poly(N-acetylethylene imine) block unit, and a propionylethylene imine block (a linear poly(N-propionylethylene imine) block unit) is dispersed in a solvent mixture of water and an organic solvent which is not compatible with water and in which the propionylethylene imine block is soluble, and preferentially hydrolyzing the poly(N-formylethylene imine) block unit (hereinafter referred to as "formylethylene imine block") or the poly(N-acetylethylene imine) block unit (hereinafter referred to as "acetylethylene imine block").

As representative examples of the block precursor, the water-soluble block copolymers represented by the following general formulae (3a), (3b), (3c), and (3d) can be mentioned:

| X-(Z-B)$_n$ | General Formula (3a): |
| X-(B-Z)$_n$ | General Formula (3b): |
| [X-(Z-B)$_n$]$_m$-Y | General Formula (3c): | and

| [X-(B-Z)$_n$]$_m$-Y | General Formula (3d) |

(in these formulae, Z is a poly(N-formylethylene imine) block unit or a poly(N-acetylethylene imine) block unit; X is a residue of a monovalent or greater polymerization initiator; B is a poly(N-propionylethylene imine) block unit; n is an integer being at least 1 and being within the range of valences of X; and m is an integer being at least 1 and being within the range of valences of X).

The molar ratio of the poly(N-propionylethylene imine) block is preferably 0.1 to 0.9 with respect to the poly(N-formylethylene imine) block unit or poly(N-acetylethylene imine) block unit.

In the present invention, the formylethylene imine block or the acetylethylene imine block, and the propionylethylene imine block are all water soluble, but attention is drawn to the point that the latter has greater solubility with respect to organic solvents when compared with the former. When an organic solvent which is incompatible with water but in which the propionylethylene imine block is soluble is added to an aqueous solution of the block precursor having a molecular chain comprising a formylethylene imine block or an acetylethylene imine block, and a propionylethylene imine block, and then agitated, the formylethylene imine block or the acetylethylene imine block dissolves in the aqueous phase, and the propionylethylene imine block dissolves in the organic solvent phase, forming an emulsion.

By adding acid or alkali to this system and heating, the formylethylene imine block or the acetylethylene imine block dissolved in the aqueous phase are preferentially hydrolyzed, and as a result, it is possible to obtain a water-soluble block copolymer having a linear chain comprising an ethylene imine block and a propionylethylene imine block. Even after forming an ionic complex with an anionic compound, this water-soluble block copolymer maintains its water solubility and also displays compatibility with organic solvents.

The water-soluble block copolymer of the present invention which has a molecular chain comprising an ethylene imine block and a propionylethylene imine block is obtained by the preferential hydrolysis of the formylethylene imine block or acetylethylene imine block of the block precursor, being the precursor polymer, having a molecular chain comprising a formylethylene imine block or an acetylethylene imine block, and a propionylethylene imine block.

The block precursor is obtained by cationic ring opening polymerization of 2-oxazoline or 2-methyl-2-oxazoline, and thereafter, further polymerization from the obtained living polymer of 2-ethyl-2-oxazoline is carried out. In the same way, by alternately repeating the polymerization of the 2-oxazoline or 2-methyl-2-oxazoline and the polymerization of the 2-ethyl-2-oxazoline, a block precursor having many blocks can be obtained. Naturally, it is also possible to carry out the polymerization of the 2-ethyl-2-oxazoline first and next carry out the polymerization of the 2-oxazoline or the 2-methyl-2-oxazoline. The manufacture of this type of block precursor is known, for example, from the Advances in Chemistry Series, 142, 320 (1975).

As the solvent used in the cationic ring opening living polymerization reaction, it is possible to use a known and commonly used solvent such as an aprotic inactive solvent or an aprotic polar solvent.

The degree of polymerization of each of the blocks of the block precursor is preferably 20 or greater. When the degree of polymerization of each block is less than 20, the characteristic features of a finally obtained water-soluble block copolymer are not readily displayed. The number of blocks contained within a single molecular chain can be appropriately selected depending on the use and is not specifically limited, but it is preferable to form di-blocks or tri-blocks which readily form nano-micelles by ion complex association.

In addition, the degree of polymerization per molecular chain of the block precursor is preferably 50 to 5000.

The ratio of the degree of polymerization, in a molecule of the block precursor, of the formylethylene imine blocks or acetylethylene imine blocks to the degree of polymerization of the propionylethylene imine blocks is preferably within the range of 2:8 to 8:2 irrespective of the number of blocks per molecular chain.

As the polymerization initiator for the cationic ring opening living polymerization, the above-mentioned ones can also be used. As the polymerization initiator, if one is used which has the above-mentioned functional groups or which has special functional groups, a block precursor having the residual group of the initiator bonded to the nitrogen atom at the end of the chain can be obtained, and by preferentially hydrolyzing the formylethylene imine blocks or the acetylethylene imine blocks, it is possible to obtain a water-soluble block copolymer in which groups having the special function are bonded to the nitrogen atom at the end of the chain.

In the case of a tri-functional or greater multifunctional polymerization initiator, it is possible to obtain a block precursor having a star shape with the initiator as the nucleus (1), and by preferentially hydrolyzing the formylethylene imine blocks or the acetylethylene imine blocks therein, it is possible to obtain a star-shaped water-soluble block copolymer in which the nitrogen atom at the end of molecular chain is bonded to the nucleus (1) having a special function.

The block precursor obtained by means of the cationic ring opening living polymerization is a living polymer and has an active point at the carbon atom at the end of the molecular chain. Therefore, it readily reacts with highly nucleophilic functional groups such as, for example, amino groups and phenolic hydroxyl groups. Consequently, when compounds having 3 or more highly nucleophilic functional groups (the above-mentioned terminal compounds) are made to react with the block precursor, which is a living polymer, a block precursor having a star shape with that compound as the nucleus is obtained (the nucleus which is the above-mentioned compound having 3 or more highly nucleophilic functional groups is abbreviated simply as "nucleus (2)" below). In other words, in this case, a star-shaped block precursor is obtained in which the carbon atom at the end of the molecular chain is bonded to the nucleus (2).

When a compound (a terminal compound) having the above-mentioned functional group which reacts with the active point and also has the above-mentioned special function is reacted with the active terminal of the block precursor, a block precursor is obtained in which the residue of that compound is bonded to the carbon atom at the end of the molecular chain, and by preferentially hydrolyzing the formylethylene imine blocks or acetylethylene imine blocks thereof, a water-soluble block copolymer is obtained which has a group having the special function bonded to the carbon atom at the end of the molecular chain. When the terminal compound is reacted with the active terminal of the star-shaped block copolymer, a star-shaped block precursor is obtained in which the group having the special function is bonded to the carbon atom at the free end of the chain, and by hydrolysis in the same way as described above, a star-shaped water-soluble block copolymer is obtained in which the group having the special function is bonded to the free end of the chain.

As the terminal compound, there are the above-mentioned compounds, and in particular, pigments having a skeleton of any of a porphyrin skeleton, a phthalocyanine skeleton, or a pyrene skeleton, having a luminescent function due to light, an energy transfer function, or an electron transfer function, can give a special function to the water-soluble block copolymer. In addition, when the compound is a tri-functional or greater multifunctional compound, a star-shaped block precursor is obtained in which the compound forms the nucleus (2), and by preferentially hydrolyzing the formylethylene imine blocks and acetylethylene imine blocks, a star-shaped water-soluble block copolymer is obtained in which the carbon atom at the end of the molecular chain is bonded to nucleus (2) having the special function.

When a monofunctional compound (terminal compound) is additionally reacted with a living polymer of a block precursor obtained using a monofunctional compound as the cationic ring-opening living polymerization initiator, and the formylethylene imine blocks or acetylethylene imine blocks of the obtained block precursor are preferentially hydrolyzed, a water-soluble block copolymer is obtained in which groups having special functions are bonded to both ends of the molecular chain. In addition, when a tri-functional or greater multifunctional compound (terminal compound) as nucleus (2) is reacted with the living polymer of the above-mentioned block precursor and the formylethylene imine blocks or acetylethylene imine blocks of the block precursor having the nucleus (2) are preferentially hydrolyzed, a star-shaped water-soluble block copolymer is obtained in which the compound having the special function is bonded to the nitrogen atom at the end of the free chain of the molecule bonded to the nucleus (2) having the special function.

By preferentially hydrolyzing the formylethylene imine blocks or the acetylethylene imine blocks of a block precursor obtained using a polymerization initiator and a terminal compound, or a combination thereof, having a skeleton of any of a porphyrin skeleton, a phthalocyanine skeleton, or a pyrene skeleton, having a luminescent function due to light, an energy transfer function, or an electron transfer function, a water-soluble block copolymer to which the group having the above-mentioned function is bonded is obtained.

Next, the method for producing the water-soluble block copolymer by preferentially hydrolyzing the formylethylene imine blocks or acetylethylene imine blocks of the block precursor will be explained.

In order to obtain the water-soluble block copolymer from the block precursor, it is necessary for the preferential hydrolysis reaction of the formylethylene imine blocks or acetylethylene imine blocks of the block precursor to be carried out in an emulsion. This emulsion substantially comprises a block precursor, water, and an organic solvent which is not compatible with water and in which propionylethylene imine blocks dissolve. When this mixture is stirred, an emulsion is formed in which the formylethylene imine blocks or acetylethylene imine blocks of the block precursor dissolve in the aqueous phase, while the propionylethylene imine blocks dissolve in the organic solvent phase. In this case, the block precursor acts as an emulsifier. The emulsion may be either of an oil/water type or a water/oil type.

As the above-mentioned organic solvent which is not compatible with water, methylene chloride, chloroform, chlorobenzene, nitrobenzene, methoxybenzene, toluene, and the like, or a mixtures of these solvents can be mentioned.

At the time of the hydrolysis reaction, acid or alkali is added to the aqueous phase as a known hydrolysis catalyst. As the acid, usual inorganic acids such as hydrochloric acid, sulfuric acid, and nitric acid can be used. As the alkali, usual inorganic alkalis such as sodium hydroxide, calcium hydroxide, and ammonia can be used.

Using the situation of a reaction in an oil/water type emulsion as an example, the concentration of the acid or alkali in the aqueous phase is suitable if it is at least one times the equivalent amount of the number of moles of the monomer units constituting the formylethylene imine blocks or acetylethylene imine blocks being hydrolyzed, and it is preferably 50 times or less that amount. If the concentration exceeds 50 times, the propionylethylene imine blocks are more readily hydrolyzed. The most preferable range is between 1 and 5 times.

The temperature for the hydrolysis reaction is preferably 100° C. or less, and is set in accordance with the concentration of the acid or alkali used. When the concentration of acid or alkali is high, the temperature is lower, for example, it is set at approximately room temperature, and when the concentration of acid or alkali is low, it is better if the reaction temperature is set high.

In a hydrolysis reaction system for an oil/water type emulsion using acid, accompanying the progress of the reaction, the oil/water type emulsion within the reaction system is converted to micelles in water, and therefore, it is possible to judge the end point of the reaction with the formation of these micelles as an index. For example, at the beginning of the reaction, an oil/water type emulsion is formed by dissolving the formylethylene imine blocks or the acetylethylene imine blocks in the aqueous phase, but the hydrochloride salt of the ethylene imine blocks generated by the hydrolysis of the formylethylene imine blocks or the acetylethylene imine blocks in the presence of hydrochloric acid becomes polymer crystals in the acidic aqueous phase. Since these polymer crystals are insoluble in the acid aqueous phase, the emulsion breaks down, and as a result, core-corona type micelles are formed in which these polymer crystals become the cores and the water-soluble propionylethylene imine blocks coat the surface of these cores. The aqueous phase becomes an opaque micelle dispersion, and the organic solvent does not form oil droplets but separates from the aqueous phase as an oil phase. This phenomenon can be clearly observed visually, and it is possible to use it as an indicator of the termination of the reaction.

In general, a time of from 2 to 48 hours is suitable for the hydrolysis reaction, and it varies depending on conditions such as the concentration of the acid and the reaction temperature.

By means of the above-mentioned hydrolysis reaction, ethylene imine blocks are formed by the preferential hydrolysis of the formylethylene imine blocks or the acetylethylene imine blocks of the block precursor, and a water-soluble block copolymer is obtained. However, when this happens, it is also possible if the quantity of acid used in the hydrolysis is in excess, a portion of the propionylethylene imine blocks neighboring the formylethylene imine blocks or acetylethylene imine blocks which are being hydrolyzed will also be hydrolyzed, and they will be incorporated into the above-mentioned ethylene imine blocks.

However, this hydrolysis reaction does not occur at random positions in the propionylethylene imine blocks, it occurs in those propionylethylene imine blocks dissolved in the organic solvent, which is incompatible with water, which are drawn into the aqueous phase due to the stirring or the thermal motion of the molecular chain. In more detail, when compared with the case in which propionylethylene imine blocks are not hydrolyzed, the result of the hydrolysis of propionylethylene imine blocks neighboring ethylene imine blocks is simply that the molecular chain of the ethylene imine blocks of the obtained water-soluble block copolymer is somewhat longer and the molecular chain of the propionylethylene imine blocks is somewhat shorter.

In the present invention, an example of a preferable composition for the formation of an oil/water type emulsion is 5 to 40 ml of water and 0.5 to 6 ml of an organic solvent which is incompatible with water with respect to 1 g of block precursor.

According to the production method of the water-soluble block copolymer of the present invention, an emulsion is formed by dispersing a block precursor in a solvent mixture of water and an organic solvent which is not compatible with water and in which propionylethylene imine blocks are soluble, and hydrolysis is carried out in the presence of an acid or an alkali, and thereby, it is possible to preferentially hydrolyze the formylethylene imine blocks or acetylethylene imine blocks of the block precursor, and obtain a water-soluble block copolymer having a molecular chain comprising linear ethylene imine blocks, which are cationic blocks, and linear propionylethylene imine blocks.

When the block precursor is synthesized by cationic ring-opening polymerization of 2-oxazoline or 2-methyl-2-oxazoline, and 2-ethyl-2-oxazoline, if a tri-functional or greater multifunctional initiator is used, a star-shaped block precursor is obtained, and by hydrolysis thereof, a star-shaped water-soluble block copolymer can be obtained.

When the cationic ring-opening living polymerization initiator has a skeleton having a special function, such as a porphyrin skeleton, a phthalocyanine skeleton, or a pyrene skeleton, it is possible to give a special function such as a luminescent function due to light, an energy transfer function, or an electron transfer function, to the finally obtained linear or star-shaped water-soluble block copolymer.

The block precursor synthesized by the cationic ring-opening living polymerization is a living polymer and has an active point on the carbon atom at the end of the molecule. By means of reacting the living polymer with a terminal compound having 3 or more groups which react with this active group, a star-shaped block precursor can be obtained, and by hydrolysis thereof, a star-shaped water-soluble block copolymer can be obtained.

As the above-mentioned terminal compound which reacts with the active point of the end of the molecule, if one of the above mentioned compounds having a skeleton having a special function is used, it is possible to give the special function to the finally obtained linear or star-shaped water-soluble block copolymer.

The water-soluble block copolymer of the present invention has a linear cationic block and it can be used in the formation of nano-micelles in water with biopolymers and the like. In greater detail, the water-soluble block copolymer of the present invention ionically bonds with anionic DNA, protein, virus, bacteria. and the like, and can be used as a carrier into which these materials have been incorporated. This type of carrier can be used in the fields of medical treatment and nano-medical treatments as a clinical diagnostic agent, a medicament, an adhesive agent for living tissue, or a preservative. In particular, the water-soluble block copolymer of the present invention is extremely useful in forming nano-micelles with DNA, and these micelles can be used as important materials in the preparation of vectors for use in gene therapy. Water-soluble block copolymers containing porphyrin or phthalocyanine can be used as a pigment-type antineoplastic agents activated by laser light in photodynamic cancer treatments. In addition, it is possible to use nano-micelles having optical functionality as nano-reactors or nano-particle catalysts.

In addition, the water-soluble block copolymer of the present invention is useful in the preparation of nano-dispersions-in-water of anionic dyes and pigments, and in addition to the above-mentioned use in medical and nano-medical treatments, or use in nano-reactors or nano-particle catalysts, it can also be suitably used in various waterborne paints and waterborne inks, and among these, waterborne jet inks, and the like. In particular, as paints which have an anionic base, Congo red, acid red, acid violet, indigo carmine, sodium phthalocyaninesulfonate, sodium phthalocyaninecarboxylate, sodium chlorophyllin, sodium phenylporphyrinsulfonate, sodium phenylporphyrincarboxylate, pyrogallol red, pyrogallol violet, hesperidin, and the like can be mentioned.

EXAMPLES

In the following, the present invention is explained in greater detail using Examples and Reference Examples. Unless otherwise stated, "%" indicates "mass %".

Molecular Weight Measurement Method

Measurement was carried out using a high-speed liquid chromatograph "HLC-8000" manufactured by Tosoh Kabushiki Kaisha (RI detector; TSK gel 2000 x1+3000 Hx 1+5000 Hx 1+guard column Hx 1–H; solvent: dimethylformamide; a flow rate of 1.0 ml/minute; and a temperature of 40° C.).

Measurement Method for Size and Size Distribution

The particle size and the particle size distribution were measured according to a dynamic light-scattering (DLS) method using a UPA particle size analysis meter "Microtrac 9203" manufactured by Nikkiso Kabushiki Kaisha (the laser light wavelength was 780 nm; the angle of reflection was 180°, and the temperature was 25° C.).

Synthesis Example 1

Synthesis of Block Precursor (1-1)

After purging a 50 ml-capacity reaction vessel with nitrogen gas, 0.171 g (1 mmol) of brominated benzene which is a cationic ring-opening living polymerization initiator, and 5 ml of N,N-dimethylacetoamide were added, and mixed at room temperature. To this solution, 8.51 g (0.1 mol) of 2-methyl-2-oxazoline were added, and then while stirring for 24 hours as 100° C., the 2-methyl-2-oxazoline was cationic ring-opening living polymerized. The polymerization rate was 98%.

After the temperature of the reaction liquid decreased to 60° C., 4.95 g (0.05 mol) of 2-ethyl-2-oxazoline were added, and then it was heated to 100° C. and stirred for 24 hours. When the temperature of the reaction mixture fell to room temperature, 10 ml of methanol were added, and thereafter, the reaction mixture was subjected to vacuum concentration. This concentrate was poured into 100 ml of diethyleether, and the polymer precipitated.

A methanol solution of the obtained polymer was re-precipitated by pouring into diethylether, and after suction filtration, the filtrate was vacuum dried, and 12.95 g of block precursor (1-1) was obtained. The yield was 95%.

The molecular weight of the obtained block precursor (1-1) was measured, and the result was a number average molecular weight (hereinafter abbreviated as "Mn") of 12000, and a molecular weight distribution of 1.15.

From $^1$H-NMR ($\delta_{TMS}$=0, CDCl$_3$) measurement, a signal (CH$_3$ 1.97 ppm) of side chain methyl groups in the acetylethylene imine blocks and a signal (CH$_3$ 1.13 ppm, CH$_2$ 2.41 ppm) originating from the side-chain ethyl groups in the propionylethylene imine blocks, and the signal of the main chain ethylene (CH$_2$CH$_2$ 3.46 ppm) of both blocks were confirmed. Consequently, from the ratio of the integration values according to the $^1$H-NMR measurement of both units, it was found that the molar composition ratio of acetylethylene imine blocks to propionylethylene imine blocks was 70:30. From this, it can be estimated that the mass of the average monomer is 89.3.

Synthesis Example 2

Synthesis of Star-Shaped Block Precursor (1-2)

0.021 g (0.033 mmol) of hexabromomethylbenzene for forming nucleus (1) of a star-shaped block precursor and which is a hexafunctional cationic ring-opening living polymerization initiator were added to a reaction vessel and the air replaced with nitrogen. Then, in a nitrogen gas flow, 1.53 g (18 mmol) of 2-methyl-2-oxazoline and 5 ml of N,N-dimethylacetoamide were successively added. This was heated to 60° C. while stirring, and maintained for 10 minutes. Next, the temperature was increased to 100° C. and stirring carried out for 20 hours. From the results of $^1$H-NMR, it was confirmed that the 2-methyl-2-oxazoline was almost completely and stoichiometrically polymerized to yield poly(N-acetylethylene imine). The molecular weight of this polymer was measured, and the results were a mass average molecular weight of 21400 and a molecular weight distribution of 1.65.

0.59 g (6 mmol) of 2-ethyl-2-oxazoline were additionally added to the above-obtained reaction liquid, and mixed for 24 hours at 100° C. After the temperature of the reaction mixture had fallen to room temperature, and 10 ml of methanol added, the reaction mixture was subjected to vacuum concentration. The concentrate was then poured into 100 ml of diethylether, and the polymer precipitated.

A methanol solution of the obtained polymer was re-precipitated by pouring into diethylether, and after suction filtration, the filtrate was subjected to vacuum drying, and thereby, 2.1 g of a water-soluble star-shaped block precursor (1-2) was obtained. The yield was 97%.

The results of molecular weight measurement and $^1$H-NMR measurement were a mass average molecular weight of 24400 and a molecular weight distribution of 1.72.

From $^1$H-NMR ($\delta_{TMS}$=0, CDCl$_3$) measurement, the signal (CH$_3$ 1.99 ppm) of side-chain methyl groups in the acetyl ethylene imine blocks and the signal (CH$_3$ 1.13 ppm, CH$_2$ 2.41 ppm) originating from the side-chain ethyl groups in the propionylethylene imine blocks, and the signal of the main chain ethylene (CH$_2$CH$_2$ 3.46 ppm) of both blocks were confirmed. Consequently, from the ratio of the integration values according to the $^1$H-NMR measurement of both units, it was found that the molar composition ratio of acetylethylene imine blocks to propionylethylene imine blocks was 80:20.

Synthesis Example 3

Synthesis of Star-Shaped Block Precursor (1-3)

2.4 g of a water-soluble star-shaped block copolymer (1-3) were obtained using the same method as was used in Synthesis Example 1 except that 0.033 g (0.052 mmol) of hexabromomethylbenzene for forming nucleus (1) of a star-shaped block precursor and which is a hexafunctional cationic ring-opening living polymerization initiator, 1.53 g (18 mmol) of 2-methyl-2-oxazoline, 0.99 g (10 mmol) of 2-ethyl-2-oxazoline, and 5 ml of N,N-dimethylacetoamide were used, and that the 2-ethyl-2-oxazoline was polymerized first and, thereafter, the 2-methyl-2-oxazoline was polymerized. The yield was 94%.

The mass average molecular weight thereof was 29700 and the molecular weight distribution was 1.81. According to $^1$H-NMR, the same signals as obtained for Synthesis Example 2 were observed, and the molar composition ratio of the acetylethylene imine blocks and propionylethylene imine blocks in the molecular chain was 68:32.

Synthesis Example 4

Synthesis of Star-Shaped Block Precursor (1-4)

0.022 g (0.027 mmol) of tetra(4-chloromethylphenyl) porphyrin for forming nucleus (1) of a star-shaped block precursor and which is a tetrafunctional cationic ring-opening living polymerization initiator, 0.12 g of sodium iodide, and 6 ml of N,N-dimethylacetoamide were added to a reaction vessel purged with argon, and stirred for 3 hours at room temperature. To this solution, 0.99 g (10 mmol) of 2-ethyl-2-oxazoline were added, heated to 100° C., and stirred for 24 hours.

After the temperature of the reaction liquid fell to 60° C., 1.53 g (18 mmol) of 2-methyl-2-oxazoline were added, the temperature was raised to 100° C., and stirring carried out for 24 hours. The obtained polymer was isolated using the same method as used in Synthesis Example 1, and 2.4 g of a water-soluble star-shaped block precursor (1-4) was obtained. The yield was 95%.

The results of molecular weight measurement and $^1$H-NMR measurement were a mass average molecular weight of 25800 and a molecular weight distribution of 1.72.

From $^1$H-NMR ($\delta_{TMS}$=0, CDCl$_3$) measurement, the signal (CH$_3$ 1.97 ppm) of side-chain methyl groups in the acetylethylene imine blocks and the signal (CH$_3$ 1.14 ppm, CH$_2$ 2.41 ppm) originating from the side-chain ethyl groups in the propionylethylene imine blocks, and the signal of the main chain ethylene (CH$_2$CH$_2$ 3.45 ppm) of both blocks were confirmed. In addition, the proton of the pyrrole ring of the porphyrin skeleton positioned at the center of the star-shaped polymer was found to be 8.82 ppm. From the ratio of the integration values according to the $^1$H-NMR measurement, it was found that the molar composition ratio of acetylethylene imine blocks to propionylethylene imine blocks was 71:29.

Since this star-shaped block precursor (1-4) has a porphyrin structure in the nucleus, high absorption at 420 nm (free base) which originates in the Soret band, which is specific to porphyrins, was observed in the absorption spectrum of an aqueous solution of the block precursor.

Synthesis Example 5

0.044 g (0.236 mmol) of methyl toluenesulfonate, 5 ml of N,N-dimethylacetoamide, and 2.34 g (0.0236 mol) 2-ethyl-2-oxazoline were added to a reaction vessel purged with nitrogen gas, and thereafter, stirred for 16 hours at 100° C.

After the temperature of the reaction liquid fell to 60° C., 2.01 g (0.0236 mol) of 2-methyl-2-oxazoline were added, the temperature raised to 100° C., and stirring carried out for 24 hours.

After the temperature of the reaction liquid fell to room temperature, 0.038 g (0.056 mmol) of tetra(4-aminophenyl) porphyrin for forming a tetrafunctional nucleus (2) was added, and stirred for 24 hours at 80° C.

The product was isolated using the same method as used in Synthesis Example 1, and 4.27 g of a water-soluble star-shaped block precursor (1-5) was obtained. The yield was 96%.

The results of molecular weight measurement and $^1$H-NMR measurement were a mass average molecular weight of 58700 and a molecular weight distribution of 1.25.

From $^1$H-NMR ($\delta_{TMS}$=0, CDCl$_3$) measurement, the signal (CH$_3$ 1.97 ppm) of side-chain methyl groups in the acetylethylene imine blocks and the signal (CH$_3$ 1.14 ppm, CH$_2$ 2.41 ppm) originating from the side-chain ethyl groups in the propionylethylene imine blocks, and the signal of the main chain ethylene (CH$_2$CH$_2$ 3.45 ppm) of both blocks were confirmed. In addition, the proton of the pyrrole ring of the porphyrin skeleton positioned at the center of the star-shaped polymer was found to be 8.79 ppm. From the ratio of the integration values according to the $^1$H-NMR measurement, it was found that the molar composition ratio of acetylethylene imine blocks to propionylethylene imine blocks in the molecular chain was 51:49.

Since this star-shaped block precursor (1-5) has a porphyrin structure in the nucleus, high absorption at 418 nm (free base) which originates in the Soret band, which is specific to porphyrins, was observed in the absorption spectrum of an aqueous solution of the block precursor.

Example 1

Synthesis of a Water-Soluble Block Copolymer (2-1a)

0.5 g of the block copolymer (1-1) obtained in Synthesis Example 1 was dissolved in 15 ml of chloroform, and thereafter, 0.85 ml of 5 mol/l aqueous solution of hydrochloric acid was added thereto. This mixture was stirred and a water/oil type emulsion was obtained. This emulsion was heated to 50° C., and stirred for 48 hours. 50 ml of acetone was added to the reaction liquid, then, after the polymer had precipitated, it was subject to suction filtration, and washed in acetone. The obtained polymer was dried, and 0.42 g of a water-soluble block copolymer (2-1a) was obtained having a molecular chain comprising ethylene imine blocks and propionylethylene imine blocks.

The result of $^1$H-NMR (TMS, external standard, in deuterium) measurement showed that the peak of 1.98 originating from the side-chain methyl groups in the acetylethylene imine blocks prior to hydrolysis had completely disappeared. However, the peak of 1.18 ppm (CH$_3$) and 2.25 ppm (CH$_2$) which originated from the side-chain ethyl groups of the propionylethylene imine blocks had not disappeared. In addition, the peak originating in the polymer main chain (CH$_2$CH$_2$) was at 3.52 ppm. From the integration values of these peaks, the molar composition ration of (ethylene imine) units to propionylethylene imine blocks is approximately 70:30. From this, it can be judged that hydrolysis had proceeded in the acetylethylene imine blocks.

Example 2

Synthesis of a Water-Soluble Block Copolymer (2-1b)

0.5 g of the water-soluble block copolymer (1-1) obtained in Synthesis Example 1 was dissolved in 20 ml of 5 mol/l hydrochloric acid (added in excess), 3 ml of chloroform was added to this, and stirred for 30 minutes to obtain an emulsion. This emulsion was heated to 50° C., and stirred for 10 hours. 50 ml of acetone was added to the reaction liquid, and after the polymer had precipitated, it was subject to suction filtration, and washing in acetone. The obtained polymer was dried, and 0.45 g of a water-soluble block copolymer (2-1b) was obtained having a molecular chain comprising ethylene imine blocks and propionylethylene imine blocks.

The result of $^1$H-NMR measurement indicated that the molar composition ratio of ethylene imine blocks to propionylethylene imine blocks in the molecular chain was 80:20.

Example 3

Synthesis of a Star-Shaped Water-Soluble Block Copolymer (2-2)

0.43 g of a star-shaped water-soluble block copolymer (2-2) having a molecular chain comprising ethylene imine blocks and propionylethylene imine blocks was obtained in the same way as in Example 2, except that the star-shaped block precursor (1-2) obtained in Synthesis Example 2 was used in place of the block precursor (1-1) used in Example 2.

The molar composition ratio of ethylene imine blocks to propionylethylene imine blocks in the molecular chain was 85:15.

Example 4

Synthesis of a Star-Shaped Water-Soluble Block Copolymer (2-3)

0.47 g of a star-shaped water-soluble block copolymer (2-3) having a molecular chain comprising ethylene imine blocks and propionylethylene imine blocks was obtained in the same way as in Example 2, except that the star-shaped block precursor (1-3) obtained in Synthesis Example 3 was used in place of the block precursor (1-1) used in Example 2.

The molar composition ratio of ethylene imine blocks to propionylethylene imine blocks in the molecular chain was 72:28.

Example 5
Synthesis of a Star-Shaped Water-Soluble Block Copolymer (2-4)

0.45 g of a star-shaped water-soluble block copolymer (2-4) having a molecular chain comprising ethylene imine blocks and propionylethylene imine blocks was obtained in the same way as in Example 2, except that the star-shaped block precursor (1-4) obtained in Synthesis Example 4 was used in place of the block precursor (1-1) used in Example 2.

The molar composition ratio of ethylene imine blocks to propionylethylene imine blocks in the molecular chain was 79:21.

Since this star-shaped water-soluble block copolymer has a porphyrin structure in the nucleus, high absorption at 420 nm (free base) which originates in the Soret band, which is specific to porphyrins, was observed in the absorption spectrum of an aqueous solution of the block copolymer.

Example 6
Synthesis of a Star-Shaped Water-Soluble Block Copolymer (2-5)

0.42 g of a star-shaped water-soluble block copolymer (2-5) having a molecular chain comprising ethylene imine blocks and propionylethylene imine blocks was obtained in the same way as in Example 2, except that the star-shaped block precursor (1-5) obtained in Synthesis Example 5 was used in place of the block precursor (1-1) used in Example 2.

The molar composition ratio of ethylene imine blocks to propionylethylene imine blocks in the molecular chain was 62:38.

Since this star-shaped water-soluble block copolymer has a porphyrin structure in the nucleus, high absorption at 442 nm (protonated) which originates in the Soret band, which is specific to porphyrins, was observed in the absorption spectrum of an aqueous solution of the block copolymer.

Practical Example 1
Preparation of a Dispersion in Water of Congo Red Pigment Using Water-Soluble Block Copolymer (2-1a)

10 mg of the water-soluble block copolymer (2-1a) obtained in Example 1 was dissolved in 3 ml of distilled water. While mixing, 2.0 mL of an aqueous solution of Congo red (3.5 mg/mL) (manufactured by Tokyo Kasei Co., an anionic red dye) was dripped into this solution,. After leaving this over night, the particle size distribution of the obtained dispersion was measured, and the result showed a mono-dispersion having an average particle size of 150 nm. This dispersion was processed in a centrifuge, and the supernatant was completely colorless and transparent. In other words, it is considered that there was no free pigment in the liquid.

Practical Example 2
Formation of Nano-Particles Due to Ionic Association of a Star-Shaped Water-Soluble Block Copolymer (2-4) and DNA 0.015 g of the star-shaped water-soluble block copolymer (2-4) obtained in Example 5 was dissolved in 1 ml of distilled water, this solution was then dripped into 4 ml of aqueous solution containing DNA extracted from salmon sperm at a concentration of 2.2 mg/ml, and stirred for 1 hour. With regard to the dispersion, when the formation of association particles of the star-shaped water-soluble block copolymer (2-4) was confirmed, a mono-dispersion of nano-particles having an average central particle size of 175 nm was observed. Furthermore, 0.2 g of table salt were added to this dispersion, making the concentration of the salt 0.69 mol/l, and when the particle size of the associated particles was reconfirmed, the average central particle size remained unchanged at 175 nm. Even with such a high concentration of salt, there was absolutely no aggregation of the nano-particles containing DNA, and when left for half-a-year, there was no change in the particles, and they maintained extremely high stability. The high degree of this stability strongly suggests that the propionylethylene imine blocks of the star-shaped water-soluble block copolymer (2-4) form water-soluble corona layers which surround the ionic association cores. It is believed that this neutral corona layer acts to weaken the electrostatic shielding effect of the salt.

The feature of the hydrolysis reactions of the present invention shown in the above-mentioned examples are that the acetylethylene imine blocks are preferentially hydrolyzed, and that the groups which are hydrolyzed are acyl groups in the side chains and the structure of the main chain of the molecular chain is completely unchanged. Consequently, the degree of polymerization of the water-soluble block copolymer before and after the hydrolysis reaction is unchanged.

The results of $^1$H-NMR measurement of the water-soluble block copolymers (2-1a) to (2-5) obtained in Examples 1 to 6 show that the peaks of 1.97 ppm originating from the methyl groups of the acetylethylene imine blocks of the block precursors (1-1) to (1-5) which are precursor polymers had completely disappeared. In contrast, the peaks of 1.13 ppm originating from the methyl groups of the propionylethylene imine blocks remained, and the integrated intensity of those peaks is partly reduced compared with before the hydrolysis, but since the extent of that decrease can be controlled by varying the length of time of the hydrolysis reaction, it is clear that the acetylethylene imine blocks are preferentially hydrolyzed.

Moreover, the molar fraction of the ethylene imine blocks in the water-soluble block copolymers (2-1b) to (2-5) after the hydrolysis reaction is greater than the molar fractions of the acetylethylene imine blocks of any of the block precursors (1-1) to (1-5) which are the precursor polymers thereof. This is because with excess hydrochloric acid, the hydrolysis reaction does not only occur in the acetylethylene imine blocks, it also occurs in propionylethylene imine blocks, and that portion is converted to ethylene imine blocks.

However, since the hydrolysis reaction of the block precursor in the present invention occurs in an emulsion, the majority of propionylethylene imine blocks which are dissolved in the organic solvent phase are not subjected to hydrolysis, and it is reasonable to understand that hydrolysis only occurs to that portion of propionylethylene imine blocks which are slightly drawn into the aqueous phase by stirring and thermal motion. In other words, the hydrolysis of propionylethylene imine blocks does not occur at random positions within those blocks, it occurs in those portions which are sequential with the ethylene imine blocks. Therefore, it can be concluded that there is essentially no disturbance to the block sequence of the water-soluble block copolymer.

As is also clear from the above-mentioned Practical Example 2, in the water-soluble block copolymer having a molecular chain comprising ethylene imine blocks and propionylethylene imine blocks, obtained by means of the production method for water-soluble block copolymers of the present invention, the ethylene imine blocks are cationic blocks and they form ion complexes with DNA, which is an anionic biopolymer, to become nano-particles dispersed in an aqueous phase.

What is claimed is:

1. A water-soluble block copolymer having a mass average molecular weight of 2500 to 800000 and comprising, within a molecule, a linear poly(ethylene imine) block unit and a linear poly(N-propionylethylene imine) block unit.

2. A water-soluble block copolymer according to claim 1 represented by one of general formula (1a):

X-(A-B)$_n$ and

X-(B-A)$_n$  General Formula (1b):

(in the formulae, X is a residue of a monovalent or greater polymerization initiator; A is the poly(ethylene imine) block unit; B is the poly(N-propionylethylene imine) block unit; and n is an integer being at least 1 and being within a range of valences of X).

3. A water-soluble block copolymer according to claim 1 represented by one of general formula (2a):

[X-(A-B)$_n$]$_m$-Y and

[X-(B-A)$_n$]$_m$-Y  General Formula (2b):

(in the formulae, X is a residue of a monovalent or greater polymerization initiator; A is the poly(ethylene imine) block unit; B is the poly(N-propionylethylene imine) block unit; Y is a residue of a monovalent or greater terminal compound; n is an integer being at least 1 and being within a range of valences of X; and m is an integer being at least 1 and being within a range of valences of X).

4. A water-soluble block copolymer according to claim 1, wherein a molar ratio of the poly(N-propionylethylene imine) block unit is 0.1 to 0.95 with respect to the poly(ethylene imine) block unit.

5. A water-soluble block copolymer according to one of claims 2 and 3, wherein X is the residue of the polymerization initiator having a valence of from 1 to 12.

6. A water-soluble block copolymer according to claim 3, wherein Y is the residue of the terminal compound having a valence of from 1 to 12.

7. A water-soluble block copolymer according to one of claims 2 and 3, wherein X is the residue of the polymerization initiator having a skeleton of one of a benzene skeleton, a porphyrin skeleton, a phthalocyanine skeleton, and a pyrene skeleton.

8. A water-soluble block copolymer according to claim 3, wherein Y is the residue of the terminal compound having a skeleton of one of a benzene skeleton, a porphyrin skeleton, a phthalocyanine skeleton, and a pyrene skeleton.

9. A production method for a water-soluble block copolymer comprising:

forming an emulsion by dispersing a water-soluble block copolymer having, in a molecule, a poly(N-formylethylene imine) block unit or a poly(N-acetylethylene imine) block unit, and a poly(N-propionylethylene imine) block unit in a solvent mixture of water and an organic solvent which is not compatible with water and in which poly(N-propionylethylene imine) is soluble; and preferentially hydrolyzing the poly(N-formylethylene imine) block unit or the poly(N-acetylethylene imine) block unit of the water-soluble block copolymer in the presence of an acid or an alkali.

10. A production method for a water-soluble block copolymer according to claim 9, wherein the water-soluble block copolymer having, in the molecule, the poly(N-formylethylene imine) block unit or the poly(N-acetylethylene imine) block unit, and the poly(N-propionylethylene imine) block unit is represented by one of:

X-(Z-B)$_n$  General Formula (3a):

X-(B-Z)$_n$  General Formula (3b):

[X-(Z-B)$_n$]$_m$-Y  General Formula (3c):

and

[X-(B-Z)$_n$]$_m$-Y  General Formula (3d):

(in the formulae, Z is the poly(N-formylethylene imine) block unit or the poly(N-acetylethylene imine) block unit; X is a residue of a monovalent or greater polymerization initiator; B is the poly(N-propionylethylene imine) block unit; n is an integer being at least 1 and being within a range of valences of X; and m is an integer of at least 1 being within a range of valences of X).

11. A production method for a water-soluble block copolymer according to claim 9, wherein a molar ratio of the poly(N-propionylethylene imine) block is 0.1 to 0.9 with respect to the poly(N-formylethylene imine) block unit or the poly(N-acetylethylene imine) block unit.

12. A production method for a water-soluble block copolymer according to claim 9, wherein a molar number of the acid or alkali is from 1 to 50 times the molar number of the monomer units making up the poly(N-formylethylene imine) block unit or the poly(N-acetylethylene imine) block unit.

* * * * *